Sept. 2, 1969        G. P. MILLER ET AL        3,464,283
GIMBALLING MEANS FOR A MOVABLE CARRIAGE
Filed March 13, 1967        2 Sheets-Sheet 1
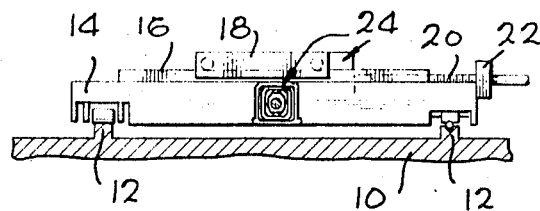
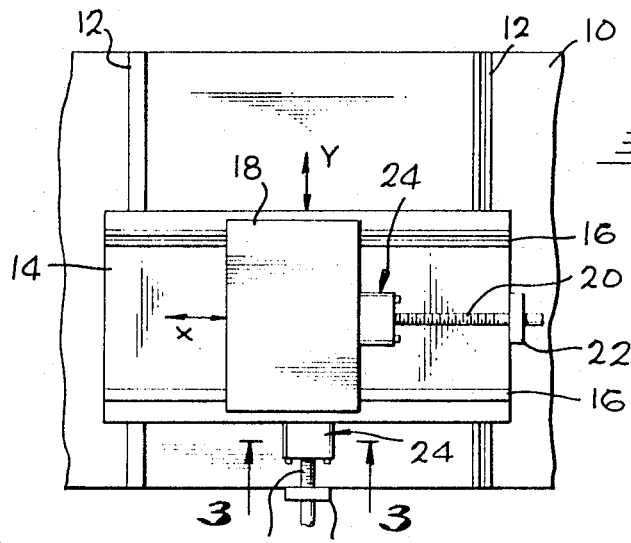
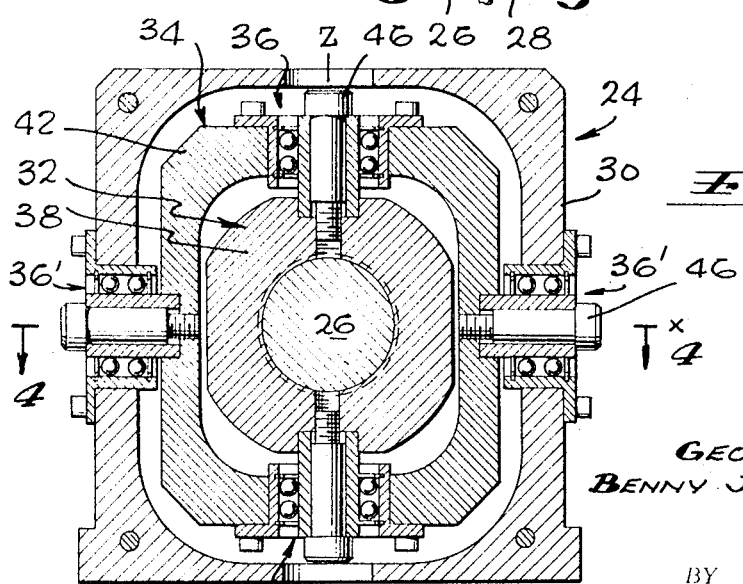
GEORGE P. MILLER
BENNY J. TERRACCIANO
INVENTORS
BY Roger A. Marra

GEORGE P. MILLER
BENNY J. TERRACCIANO
INVENTORS

BY
Roger A. Marrs

United States Patent Office 3,464,283
Patented Sept. 2, 1969

3,464,283
GIMBALLING MEANS FOR A MOVABLE CARRIAGE
George P. Miller, Woodland Hills, and Benny J. Terracciano, Canoga Park, Calif., assignors to The Bunker-Ramo Corporation, Canoga Park, Calif., a corporation of Delaware
Filed Mar. 13, 1967, Ser. No. 622,565
Int. Cl. F16h *1/18, 1/20;* B23b *47/18*
U.S. Cl. 74—424.8                                7 Claims

ABSTRACT OF THE DISCLOSURE

A gimbal apparatus for coupling a lead screw to a movable carriage incorporating a threaded member on the lead screw for supporting the carriage whereby the carriage has angular movement about first and second axes normal to the lead screw axis and further including ball bearing supports permitting freedom of rotation and translation about and along their axes.

---

The invention herein described was made in the course of or under a contract or subcontract thereunder, with United States Army Engineer Research and Development Laboratories, Fort Belvoir, Va.

BACKGROUND OF THE INVENTION

Field of the invention

The present invention relates in general to gimbal coupling apparatus and, more particularly, to a novel apparatus useful for coupling a movable carriage to a positioning actuator such as a lead screw.

Description of the prior art

It is well known that movable carriages are essential elements in various types of scanning and printing devices. Such movable carriages generally ride on a pair of parallel ways which are securely attached to a rigid base. One type of movable carriage may, in turn, carry a second pair of orthogonal parallel ways upon which a second movable carriage may be mounted so as to allow scanning motion over the entire surface of the base. The actuating means for moving these carriages is often provided by one or more lead screws which are operatively coupled independently to the movable carriages and which, upon being rotated through a threaded support affixed to the base, drive the carriages along their respective ways.

Parallelism of the motion of the lead screw nut to the motion of the carriage which it drives is a very critical aspect in the construction of a precision measuring machine or a similar positioning device which has a linearly guided piece actuated by a suitable linear driving means. In the practical situation, true and even adequate parallelism of this motion is all but impossible to achieve due to the deviations of the various parts from the true or exact geometry required. Some of the deviations found in prior art devices are misalignment of the lead screw with respect to the ways, eccentricity of the lead screw with respect to its threaded support or journal, eccentricity of the journal supporting the lead screw, non-parallelism of the mating surfaces of the attaching means of the driving and driven pieces, rotational motion of the carriage due to non-linearity and lack of parallelism of the ways, inherent deflections of the device under static and dynamic loads, and motion errors caused by the contamination of the bearing and guiding surfaces with dust and lint particles.

Errors or faults such as these invariably spoil the accuracy of the machine, its smoothness or low friction characteristics, and its ease of operation, and shorten its life. Since the critical parts of precision devices must have the maximum degree of rigidity obtainable, any deviation or error from the true or exact geometry or any tendency of relative motion of the critical parts with respect to each other generates undesirable stresses and strains which act to distort and thereby destroy the inherent precision of the machine and unduly load the bearing surfaces, thus causing unnecessary wear and decrease of accuracy life.

SUMMARY OF THE INVENTION

The present invention has succeeded in obviating all of the aforementioned disadvantages of prior art devices by providing a gimbal apparatus for coupling a lead screw to a movable carriage, thus permitting the movable carriage to have angular movement about first and second axes normal to the lead screw axis. In addition, the gimballing apparatus includes bearing supports which are non-compliant in the drive direction, but which permit freedom of rotation and translation about and along their axes. Thus, while the lead screw to the carriage coupling is rigid in the drive direction, all of the deviations of the various parts from the required true or exact geometry are permitted without spoiling the accuracy of the machine. In addition, the present invention provides coupling apparatus for a drive lead-movable carriage system which reduces installation of the drive system to a mere placement and attachment of parts in lieu of the complex measurement and hand fitting required by the prior art.

These and other advantages of the present invention will become more apparent from the following detailed specification in conjunction with the accompanying drawings. In addition, reference numerals have been carried forward where appropriate throughout the drawings to designate like parts of the invention.

BRIEF DESCRIPTION OF THE DRAWINGS

FIGURE 1 is a side view of a carriage structure suitable for use with the present invention;

FIG. 2 is a top plan view of a carriage structure suitable for use with the present invention;

FIG. 3 is an enlarged cross-sectional view of the coupling apparatus of the present invention as taken in the direction of arrows 3—3 of FIG. 2;

DESCRIPTION OF THE PREFERRED EMBODIMENT

Figure 4:
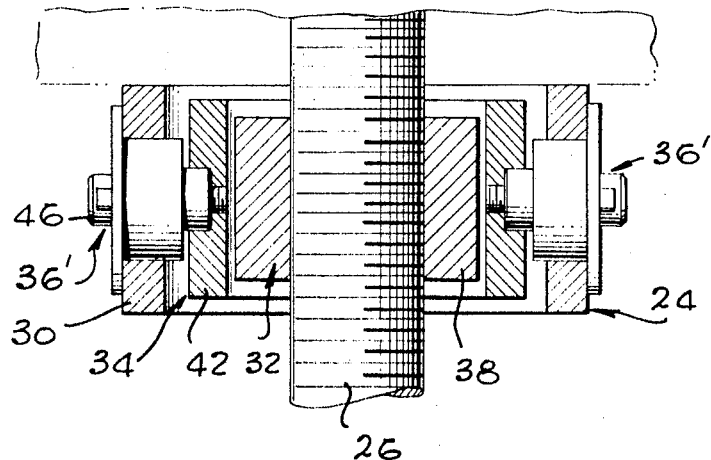
FIG. 4 is a cross-sectional view of the coupling apparatus illustrated in FIG. 3 as taken in the direction of arrows 4—4 thereof.

Referring to FIG. 1, a portion of a scanning or printing table suitable for use with the present invention is shown. The table consists of a rigid base 10 upon which are secured a pair of Y-direction ways 12 securely attached to the base 10. Mounted on the Y-direction ways 12 is a first carriage 14, which is movable in the Y direction. The movable carriage 14 has secured upon it a pair of X-direction ways 16 upon which rides a movable carriage 18. The relative positions and alignments of the various ways and carriages can be better seen with reference to FIG. 2, which illustrates the table 10, the ways 12 and 16, and the carriages 14 and 18.

Driving the carriage 18 is a lead screw 20, which is supported by a radial and thrust bearing or journal 22. The lead screw 20 is coupled to the carriage 18 by means of the novel coupling apparatus of the present invention, as described more fully hereinafter. In a like fashion, the carriage 14 is driven by a lead screw 26 supported by a radial and thrust bearing or journal 28. The lead screws 20 and 26 are coupled to the movable carriage 14 by means of the novel coupling apparatus 24 of the present invention shown in more detail in FIG. 3.

In FIG. 3, a cross-sectional view of the novel coupling apparatus of the present invention is illustrated. The lead screw 26, for example, is coupled to an outer housing 30 of the coupling apparatus 24 via members 32 and 34 and bearings 36 and 36', which outer housing 30 is in turn secured to the movable carriage 14. As shown in FIGS. 3 and 4, the lead screw 26 is free to rotate around its own axis within a nut member 38 of the first means or inner gimbal 32, but is restricted in its translational motion along its own axis by means of bearings 28. Thus, the lead screw 26 is free to rotate around its own axis and at the same time is rigidly coupled to the carriage 14 to translate it along the ways 12 in the Y direction.

The member 38, by means of reciprocating bearings 36, is coupled to and rotatably supported by a member 42 of a second means or the outer gimbal 34. Member 42 of the outer gimbal 34, by means of bearings 36', is in turn coupled to and rotatably supported by the outer housing 30 of the coupling apparatus 24. It is thus apparent that, by means of the inner gimbal 32 and the outer gimbal 34, the lead screw is free to pivot about the Z-axis and the X-axis (as shown) normal to the lead screw axis (Y axis, and thus compensate for the various disturbing factors recited previously).

Figure 5:
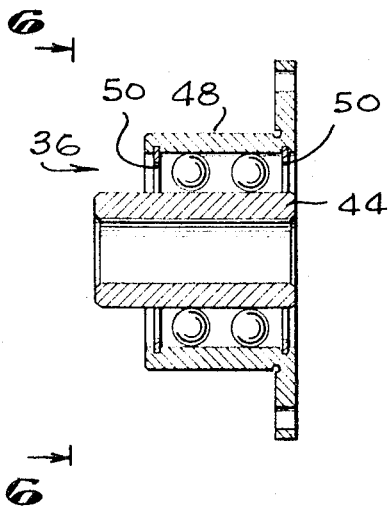
FIG. 5 is a cross-sectional view of the reciprocating type bearing incorporated in the coupling apparatus of the present invention.
Figure 6:
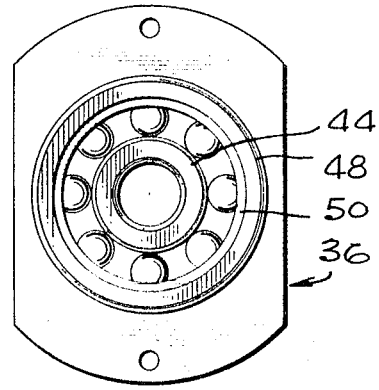
FIG. 6 is an end elevational view of the bearing as taken in the direction of arrows 6—6 of FIG. 5.

While the gimbals 32 and 34 compensate for angular deviations or deflections of the lead screw 26 with respect to the carriage 14 and conversely, applicant has also provided by his invention means by which translational errors in other than the drive direction may be compensated for. To this end, applicant has provided a reciprocating type of bearing used at 36 and 36', which allows the gimbals 32 and 34 to move in any direction normal to the axis of the screw 26, i.e., X and Z directions, as well as to adjust to varying drive screw angles. As shown in FIGS. 3, 5, and 6, the bearing 36 has an inner sleeve 44 which attaches to member 42 or member 38 by means of bearing retainer screw 46. The bearing 36' has an outer sleeve and mounting plate 48 which is attached to the outer housing 30 of the coupling means 24 or the member 42 of the gimbal 34 in the case of bearing 36. The bearing 36 is unique in that it has no raceway comparable to the usual ball bearing. The bearing surfaces of the sleeves 44 and 48 are cylindrical, and the balls are sized to develop a preload. Since the bearing 36 has a cylindrical raceway, the bearing 36, while having no free play normal to its axis, is free to rotate and translate about and along its axis.

Thus, when used in the coupling 24, the bearings 36 are very stiff in the drive direction (Y direction), but are very compliant in the X and Z directions. Any extraneous forces on the carriage 14 are limited to the rolling friction of the balls in the bearings 36. The bearings 36 are provided with retainer rings 50 which serve as limit stops on the translational motion of the balls. The balls are free to roll until they come up against one of the retaining rings 50, and any further motion must take place by sliding friction of the inner sleeve 44 and the outer sleeve 48 against the surfaces of the ball bearings. The retaining rings 50 serve to hold the bearing assembly together.

The embodiments of the invention in which an exclusive property or privilege is claimed are defined as follows:

1. In combination:
a movable member mounted for linear movement along a first axis and subject to angular movement about second and third axes normal to said first axis;
means driving said movable member; and
means coupling said driving means to said movable member, said coupling means comprising:
first gimbal means receiving said driving means, said first gimbal means being axially movable along said first axis with respect to said driving means;
second gimbal means;
first support means operatively coupled between said first and second gimbal means rotatably supporting said first gimbal means about said second axis; and
second support means operatively coupled between said second gimbal means and said movable member rotatably supporting said second gimbal means about said third axis, whereby said driving means is afforded two separate degrees of rotational freedom, and wherein said first and second supporting means are ball bearing means having a plurality of individual ball bearings and inner and outer sleeves for constraining said ball bearings therebetween, said inner and outer sleeves having smooth, parallel extending, cylindrical surfaces for movably and collectively supporting said ball bearings, each of said ball bearings being operative to move laterally toward and away from adjacent ones of said ball bearings whereby said ball bearing means afford said drive means two independent degrees of translational freedom along said second and third axes.

2. The apparatus as defined in claim 1 wherein said driving means is a lead screw and said movable member is a movable carriage.

3. The apparatus as defined in claim 1 wherein said first gimbal means is adapted to permit said driving means to rotate about said first axis.

4. The apparatus as defined in claim 2 wherein said movable carriage is supported on a pair of parallel ways.

5. The apparatus as defined in claim 1 wherein said inner sleeve translates movement with respect to said outer sleeve by means of the rolling motion of said ball bearings.

6. The apparatus as defined in claim 5 further comprising
retaining means for restraining lateral rolling motion of said ball bearings after a predetermined amount of lateral translational movement.

7. The invention as defined in claim 1 including
retaining means disposed in fixed spaced-apart relationship on opposite ends of each of said outer sleeves projecting into the space between said cylindrical surfaces for restraining said ball bearings after a predetermined amount of translational movement.

References Cited

UNITED STATES PATENTS

| | | | |
|---|---|---|---|
| 373,092 | 11/1887 | Peregrine | 308—6 X |
| 870,340 | 11/1907 | Becroft | 308—190 |
| 1,158,106 | 10/1915 | Clark | 308—186 |
| 1,486,796 | 3/1924 | Peniston | 308—186 |
| 1,622,880 | 3/1927 | Perkins | 308—176 |
| 1,888,361 | 11/1932 | Robinson | 308—186 |
| 1,972,384 | 9/1934 | Hume | 308—178 X |
| 2,727,796 | 12/1955 | Sardou | 308—178 X |
| 3,336,810 | 8/1967 | Schaffer | 74—5 |
| 899,534 | 9/1908 | Hoffman | 64—18 |
| 2,311,815 | 2/1943 | Briney. | |
| 2,833,598 | 5/1958 | Sloyan | 308—3 X |
| 2,910,883 | 11/1959 | Reed. | |
| 3,371,545 | 3/1968 | McNeal et al. | 74—89.15 |

FOREIGN PATENTS

| | | |
|---|---|---|
| 6,343 | 3/1914 | Great Britain. |

OTHER REFERENCES

Sand Paper Machines, SKF, March 1941.

MARTIN P. SCHWADRON, Primary Examiner

L. L. JOHNSON, Assistant Examiner

U.S. Cl. X.R.

77—34.7; 308—2, 3, 6, 61, 176